(12) United States Patent
Williams et al.

(10) Patent No.: US 7,605,923 B2
(45) Date of Patent: Oct. 20, 2009

(54) EMBEDDABLE POLARIMETRIC FIBER OPTIC SENSOR AND METHOD FOR MONITORING OF STRUCTURES

(75) Inventors: Jeffery Lee Williams, Huntsville, AL (US); Michael Scott Kranz, Madison, AL (US); Larry Christopher Heaton, Huntsville, AL (US)

(73) Assignee: Morgan Research Corporation, Huntsville, AL (US)

( * ) Notice: Subject to any disclaimer, the term of this patent is extended or adjusted under 35 U.S.C. 154(b) by 352 days.

(21) Appl. No.: 11/251,739

(22) Filed: Oct. 17, 2005

(65) Prior Publication Data

US 2006/0081772 A1    Apr. 20, 2006

Related U.S. Application Data

(60) Provisional application No. 60/619,419, filed on Oct. 15, 2004.

(51) Int. Cl.
*G01B 9/02* (2006.01)
(52) U.S. Cl. ..................................... 356/477
(58) Field of Classification Search ................ 356/477, 356/478, 491; 250/227.16, 227.17; 385/12, 385/13
See application file for complete search history.

(56) References Cited

U.S. PATENT DOCUMENTS

| | | | |
|---|---|---|---|
| 4,659,923 A | | 4/1987 | Hicks, Jr. ................ 250/227.19 |
| 4,725,143 A | * | 2/1988 | Jones et al. .................. 356/477 |
| 4,867,565 A | * | 9/1989 | Lequime ..................... 356/453 |
| 5,054,922 A | * | 10/1991 | Kersey ........................ 356/477 |
| 5,064,270 A | | 11/1991 | Turpin et al. ................... 385/13 |
| 5,201,015 A | | 4/1993 | Von Bieren et al. ........... 385/13 |
| 5,381,005 A | | 1/1995 | Chazelas et al. ........ 250/227.19 |
| 5,422,713 A | | 6/1995 | Bramson |
| 5,448,657 A | | 9/1995 | Kim et al. ...................... 385/12 |
| 5,636,021 A | | 6/1997 | Udd ............................ 356/483 |
| 5,909,273 A | | 6/1999 | Malvern |
| 6,747,743 B2 | | 6/2004 | Skinner et al. |
| 6,816,266 B2 | | 11/2004 | Varshneya et al. |
| 6,816,638 B1 | | 11/2004 | Bennion et al. |
| 6,829,397 B2 | | 12/2004 | Wang et al. |
| 6,879,742 B2 | | 4/2005 | Chi et al. |
| 6,888,125 B2 | | 5/2005 | Ronnekleiv et al. |
| 6,931,031 B2 | | 8/2005 | Williams et al. |

\* cited by examiner

*Primary Examiner*—Hwa (Andrew) S Lee
(74) *Attorney, Agent, or Firm*—Greenberg Traurig LLP (57) ABSTRACT

The present invention provides the capability of ascertaining, through a quick and simple measurement, locations on a structure that may have experienced damage that could result in reduced structure lifetime, strength, or reliability. The sensing element is a connectorized section of polarization maintaining ("PM") optical fiber, where a length of PM fiber represents a fully distributed sensor array. Stress-induced changes to the sensor are measured through white-light Polarimetric interferometry. The output of the measurement is a data array representing the stress concentration magnitude at an array of locations along the length of the sensor. In an application, the knowledge of the optical fiber position on the structure, coupled with the measurement of stress locations along the fiber length, allows the user to determine locations on the structure with large stress concentrations. These locations may signify structural damage. This knowledge would allow the user to employ a more sophisticated system, albeit a larger and slower one, to fully characterize and evaluate that area of potential damage and take appropriate action.

21 Claims, 8 Drawing Sheets

EMBEDDABLE POLARIMETRIC FIBER OPTIC SENSOR AND METHOD FOR MONITORING OF STRUCTURES

REFERENCE TO RELATED APPLICATIONS

This application claims priority to Provisional Patent Application U.S. Ser. No. 60/619,419, entitled "Embeddable Polarimetric Fiber Optic Sensor and Method for Monitoring of Structures" and filed on Oct. 15, 2004, which is fully incorporated herein by reference.

GOVERNMENT LICENSE RIGHTS

This invention was made with Government support under contract number F33615-02-C-5013, awarded by the Missile Defense Agency. The Government has certain rights in the invention.

BACKGROUND

1. Field of the Invention

The present invention relates generally to a stress sensor. More particularly, the present invention relates to a fiber optic sensor that monitors stress on a structure.

2. Background of the Invention

Embedding miniature sensors in structures, systems, storage and shipping containers, and other items allows the monitoring of these items to determine health, maintenance needs, lifetime, and other item characteristics. Information from miniature embedded stress sensors in a composite or other structure can tell a user information including whether or not the item has been dropped sufficiently to cause damage, stressed to a point that makes the integrity of the structure suspect, undergone more cyclic variations than it can handle, or has other health or performance issues.

Most current structures do not employ embedded sensors to aid in the determination of structural health. Instead, structures are assigned an operational lifetime that is significantly shorter than what could be achieved. In addition, structures are given a maintenance schedule and maintenance or disposal guidelines that are more frequent and strict than may be necessary. These procedures result in excess cost to an application and the user as structures are replaced, repaired, and maintained more often than necessary, while also using maintenance techniques and products that are more sophisticated and costly than they need to be. By using embedded sensors within structures, users can measure the actual health of the structure at a given point in time, regardless of the previous conditions seen by the structure, and then perform maintenance and replacement activities as necessary based on diagnosis of the structures' health rather than on a predetermined schedule.

To maintain reliability and integrity of the materials, sensors are often needed to monitor structure degradation while in storage, transport, or before use. A common method for detection of strain in a structure is to embed fiber optic sensors within the material. The two methods that are often used to detect damage utilize Fiber Bragg Gratings ("FBGs") and etalons.

FBGs and the associated Bragg phenomenon have long been studied and implemented in numerous commercial applications, some of which have been related to structural health monitoring ("SHM"). A Fiber Bragg Grating is a periodic index of refraction gradient created in the optical fiber core. The grating allows only certain wavelengths to pass through the grating and others to be reflected back from the grating. Strains in the structure, and hence the optical fiber, alter the periodicity of the grating, thereby altering its transmission and reflection properties. These changes can be measured and stress concentrations can be calculated from the data.

In particular to SHM, FBGs have long been studied at a research level while some have been carried to the commercial availability stage. Regardless of the commercial readiness of a particular FBG, it can be described as a localized fiber optic sensor. In other words an FBG is a sensor that has a sensitive area that is dependent on the length of the grating that has been written on the optical fiber. A FBG cannot, for example, detect an applied strain that is not coincident or directly applied to the area of the optical fiber that contains the Bragg Grating. In many applications this is an acceptable operational procedure, while others may require a more distributed sensing technique.

One procedure to allow for multiple FBG sensing sites along a single optical fiber is to multiplex the FBGs together using more sophisticated instrumentation. Three problems often exist with this approach to achieve a partial distributed sensor: multiple sites along the fiber must be prepared to write the FBGs, sites of interest on the structure must be predetermined and matched to the location of the gratings, and more sophisticated and expensive instrumentation is required to interrogate multiple FBGs.

One concern that often accompanies the procedure to embed FBGs into a structure is that in many cases the protective acrylate coating of the optical fiber has to be removed in order to write the FBG. The removal of the protective coating requires special procedures to minimize potential damage due to handling and or environmental conditions. These procedures can often restrict the type of environment that can implement a FBG or require a protective device that is not allowable in the structure to be monitored.

Similar in sensor arrangement to FBGs are Fabry-Perot Etalons ("FPE"). Etalons are a point source detection scheme that can measure stress applied to the structure that the FPE is embedded in. Etalons have been shown to have exceptional characteristics for detecting stress in a matrix and indicating relative levels of that stress. To be useful and to ensure optimum sensitivity, however, the potential locations for damage must be identified before the etalons are placed in the structure. Also, as is the case with FBGs, the protective coating on the fiber near the etalon is most often removed to improve sensitivity of the sensor. This removal of material drastically decreases the robustness of the sensor, which could limit its end application for use in hostile environments.

It would therefore be desirable to have a fiber optic stress sensing system that overcomes the limitations of FBGs and FPEs and offers a more robust and cost effective sensor that can be installed in a distributed fashion over a structure without requiring pre-designation of areas of potential stress.

SUMMARY OF THE INVENTION

It is therefore an object of the present invention to provide a stress sensing system using optical fiber distributed throughout a structure without requiring predetermined areas of interest on the structure.

It is a further object of the invention to provide a fiber optic stress sensing system that does not require the removal of the protective coating from the optical fiber.

It is a further object of the invention to provide a fiber optic stress sensing system that utilizes commercially-available instrumentation and processes to monitor strain on a structure.

In contrast to the prior art techniques, which have limited robustness and which require pre-identification of the potential locations of damage, the present invention uses simple white-light polarimetric interferometry and commercial-of-the-shelf ("COTS") polarization-maintaining optical fibers capable of sensing strain applied directly to the fiber anywhere along its length, without the need to create separate discrete sensor sites or the need to multiplex multiple sensors to cover an entire region of the structure. This fully distributed sensing capability makes selective sensor placement less difficult and increases the overall sensitive area on a structure in which it is embedded.

Figure 1:
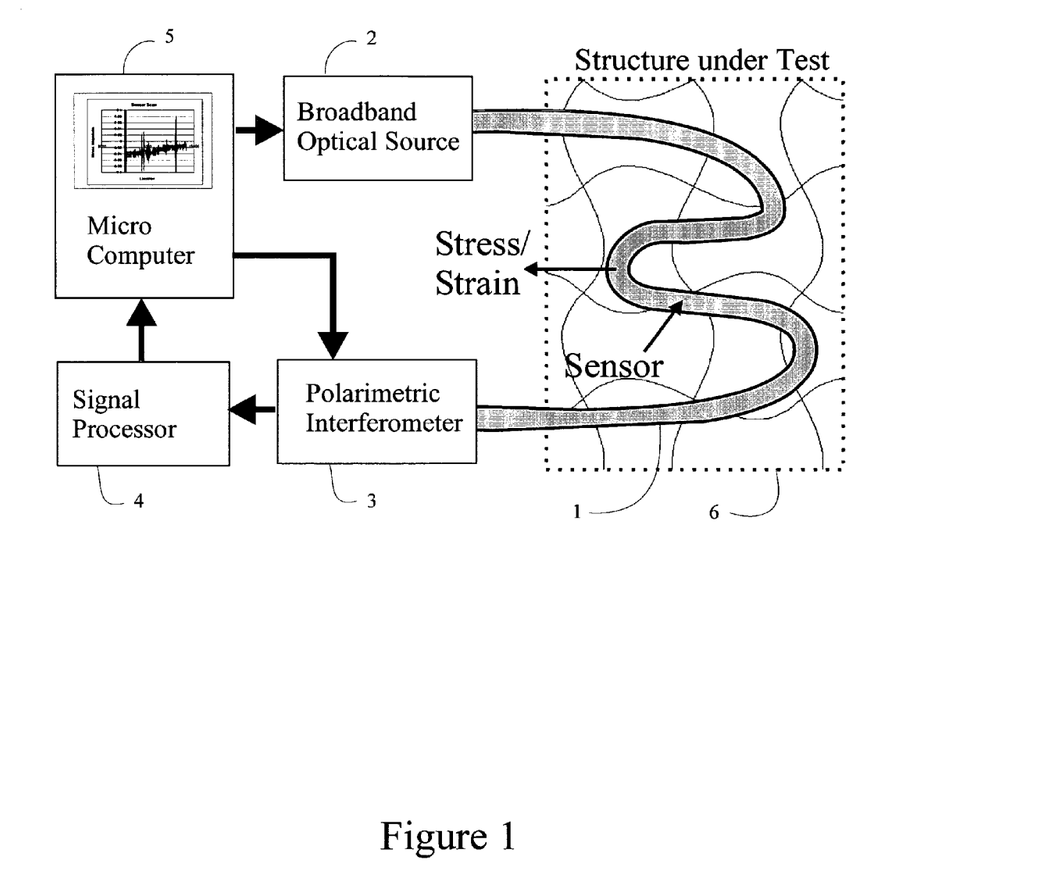
FIG. 1 is a simplified block diagram of an embodiment of the invention and its operation.

The present invention consists of a method and apparatus for the monitoring of structures using embeddable polarimetric fiber optic sensors. FIG. 1 is a simplified block diagram of the invention, which is comprised of polarization-maintaining optical fiber 1 of sufficient length to cover the region of the structure to be monitored 6, a broadband white light optical source 2 with a short coherence length, an optical interferometer 3 with an optical path-scanning length sufficient to cover the length of the fiber sensor 1, a signal processing unit 4, and a computer or other microcontroller 5. The optical fiber sensor 1 is first embedded or attached to the structure 6 in a fashion that allows the stresses in the structure 6 to be transferred to the fiber 1. Then, a broadband optical source 2 launches a polarized short coherence length optical pulse into one end of the optical fiber 1. Localized stresses within the structure 6 delay the transmission of that pulse as it travels down the fiber. At the other end of the fiber, a polarizer 11 (illustrated in FIG. 2) projects the polarized output light onto a common polarization axis. The light then enters the interferometer 3 where light from one leg of the interferometer 3 is superimposed onto light from the other leg at varying amounts of delay. When the delay caused by changing the distance of one leg of the interferometer equals the pulse delay caused by localized stresses in the fiber sensor 1, large constructive interference occurs, and the distance of the stress concentration from the end of the fiber sensor 1 can be calculated.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

These and other embodiments of the present invention will also become readily apparent to those skilled in the art from the following detailed description of the embodiments having reference to the attached figures, the invention not being limited to any particular embodiment(s) disclosed.

Repeat use of reference characters throughout the present specification and appended drawings is intended to represent the same or analogous features or elements of the invention

DETAILED DESCRIPTION

The present invention and its advantages are best understood by referring to the drawings. The elements of the drawings are not necessarily to scale, emphasis instead being placed upon clearly illustrating the principles of the invention.

Figure 2:
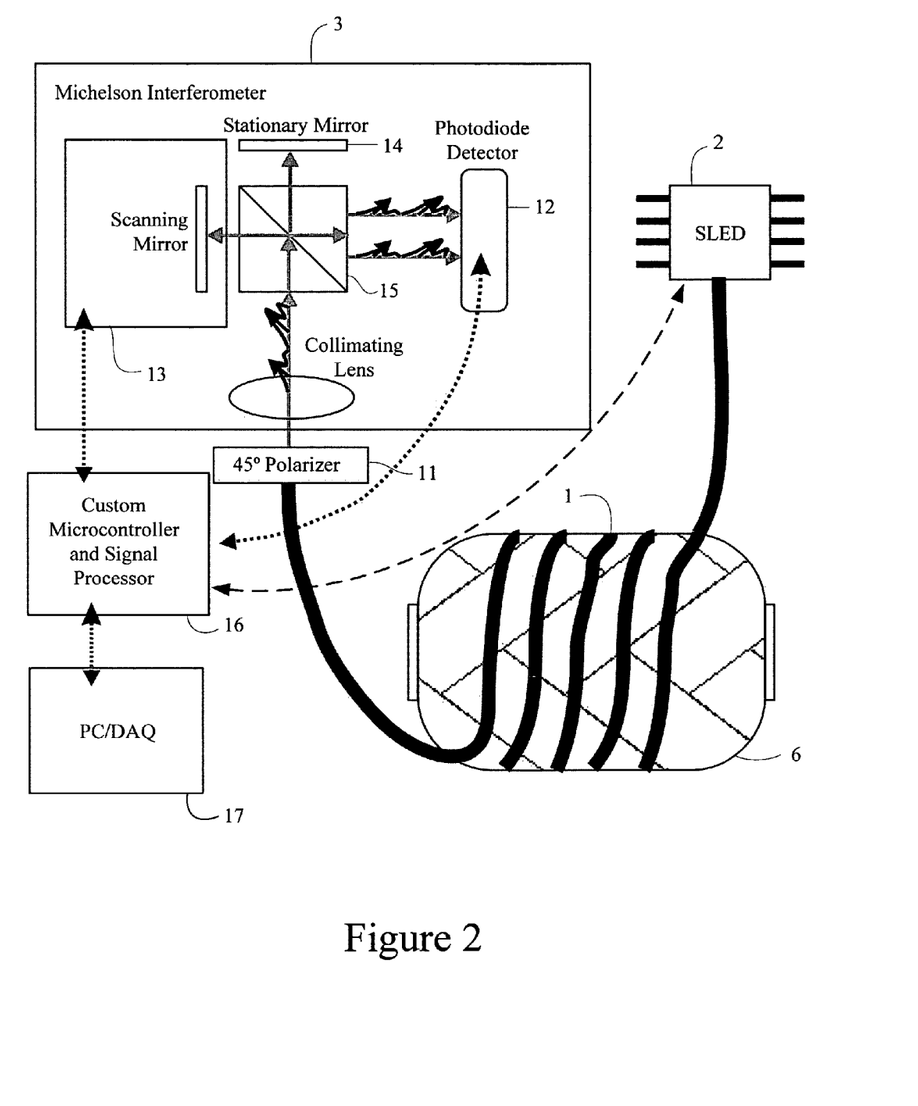
FIG. 2 is a schematic diagram of the one embodiment of the sensor and its readout system.
Figure 3:
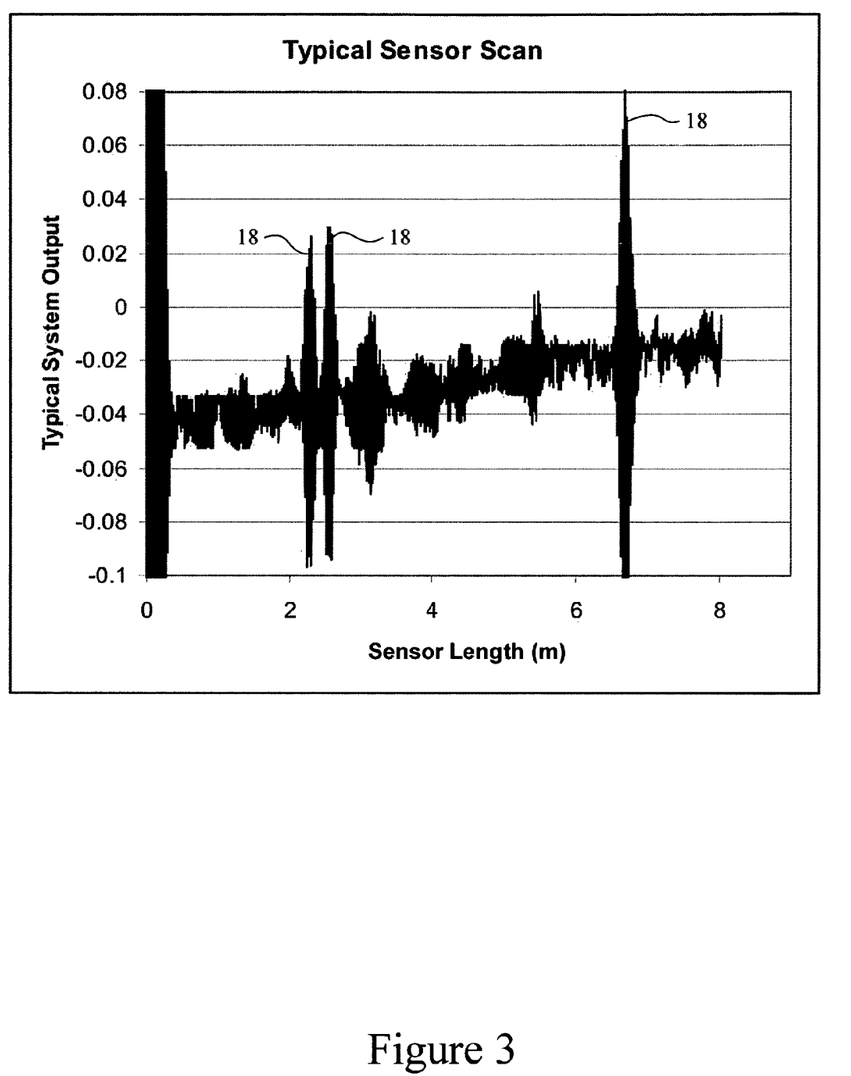
FIG. 3 illustrates an example of the data collected from one embodiment of the sensor.

One embodiment of the invention is shown in FIG. 2. This embodiment uses a 30 mW 1565 nm super-luminescent light emitting diode ("SLED") with a 3 dB bandwidth of 38 nm, resulting in a coherence length of 41 μm as the broadband optical source 2, although other optical sources could be used without departing from the scope of the invention. The output of the optical source 2 is polarized and aligned to one axis of the embedded fiber sensor 1. The fiber sensor 1 itself is a continuous length of polarization-maintaining single mode optical fiber wound around and embedded into the device under test 6. The fiber sensor 1 output is first transmitted through a polarizer 11 aligned at 45 degrees to the polarization axis of the fiber sensor 1. The output from the polarizer 11 is launched into the input of an optical interferometer 3 configured as a standard Michelson interferometer. One leg of the interferometer 3 is scanned by an optical stage and stepper motor (within the scanning mirror 13), with the scanning distance recorded using an optical encoder (within the scanning mirror 13). A signal processor 16 controls the movement of the scanning mirror 13 and converts analog data from the interferometer into digital form for recording on the PC 17. The amplitude of the interferogram that results from at each step of the scan is collected on a photodiode detector 12 and recorded by the PC 17. As shown in FIG. 3, large amplitudes within the interferogram represent points of localized stress 18.

Although the embodiment discussed above utilizes a Michelson interferometer, the system and method disclosed herein would also work with other types of optical interferometric devices (such as a Sagnac interferometer) in which the optical path distance of one beam of light can be varied significantly and then superimposed upon the original beam of light.

Figure 4:
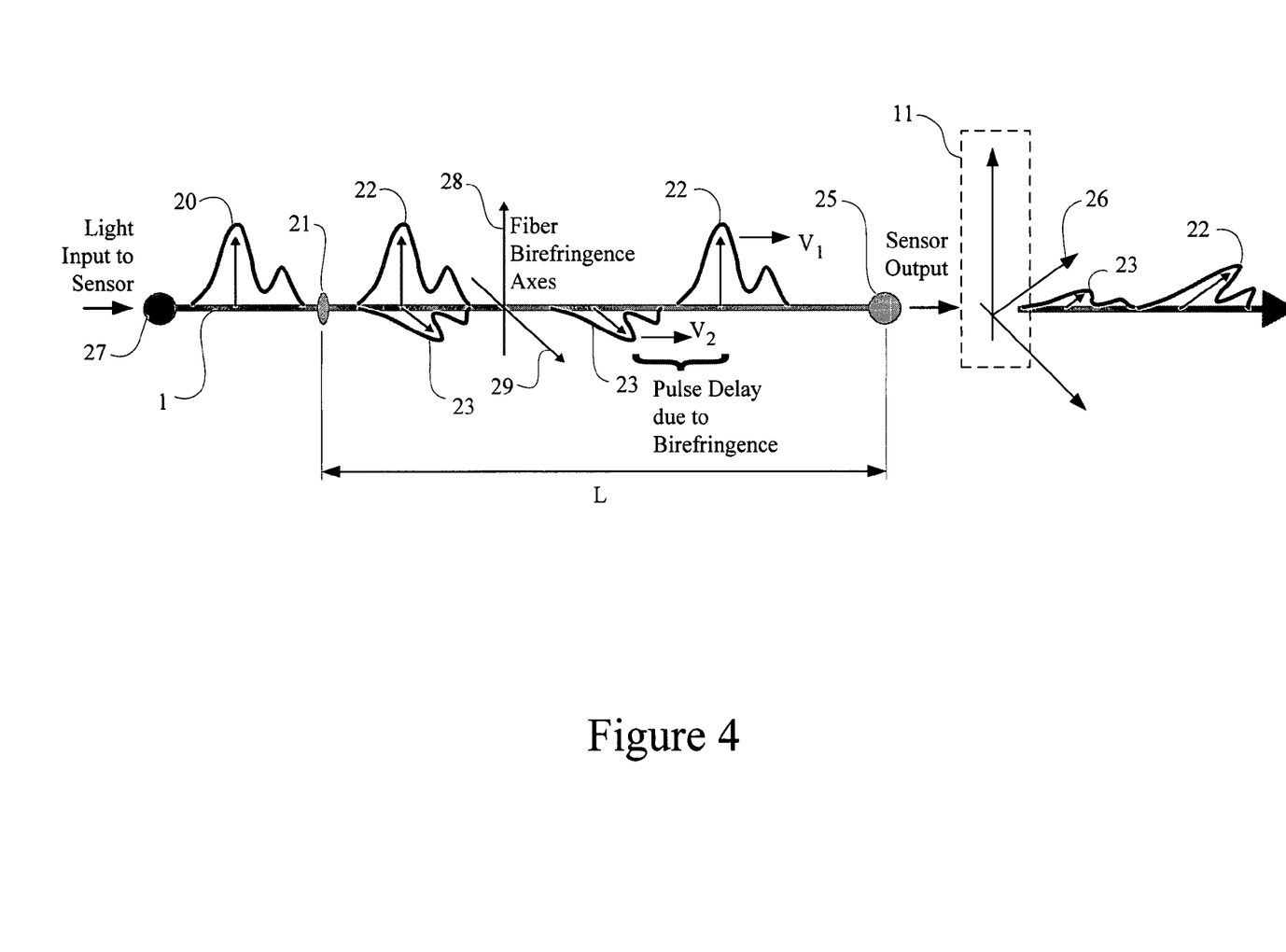
FIG. 4 is a graphical representation of the sensing operation.

The readout technique for the sensor is a white light interferometric technique that operates as shown in FIG. 4. The polarized light pulse 20 of the optical source is launched into the input end 27 of the optical fiber sensor 1. Due to the birefringence of that fiber, the input light pulse 20 will have a tendency to align itself with one of the two stable polarization axes (the primary polarization axis 28 and the orthogonal axis 29) within the fiber. However, local stress gradients 21 along the length of the fiber sensor 1 alter the local birefringence of the fiber sensor 1. These stress-induced local changes in birefringence act as stress sensors and couple light from one of the polarization axes into the other, resulting in a division of the light pulse 20 into a "remaining" pulse 22 that remains in the primary polarization axis 28 and a "coupled" pulse 23 in the orthogonal axis 29. Larger stresses in the fiber sensor 1 produce a larger amplitude of the coupled pulse 23. The birefringence also yields a difference of light propagation velocities for the two polarization axes. Therefore, as the original launched light travels farther away from the point of local stress, the light pulses will separate in space, but will remain in their respective polarization states, creating a "pulse delay" between the remaining pulse 22 and the coupled pulse 23. At the output end 25 of the fiber sensor 1, a 45° polarizer 11 projects the light pulses 22 and 23 from their separate polarization axes onto a common axis 26.

Referring to FIG. 2, after the light exits the fiber sensor 1 and polarizer 11, it is launched into an interferometer 3. The interferometer 3 uses a beamsplitter 15 to divide the light into two optical paths. A photodiode detector 12 within the interferometer 3 then detects intensity changes resulting from the interference of the two waves with different phases traveling in the two optical paths. The purpose of the interferometer 3 is to measure the stress-induced delay in the light pulses 22 and 23 (FIG. 4) by altering the optical path difference of two beams of that light. The amount of optical path difference required translates to the amount of delay and the distance of the output end of the optical fiber sensor 1 back to the local stress gradient. This process is illustrated in FIG. 5.

Figure 5A:
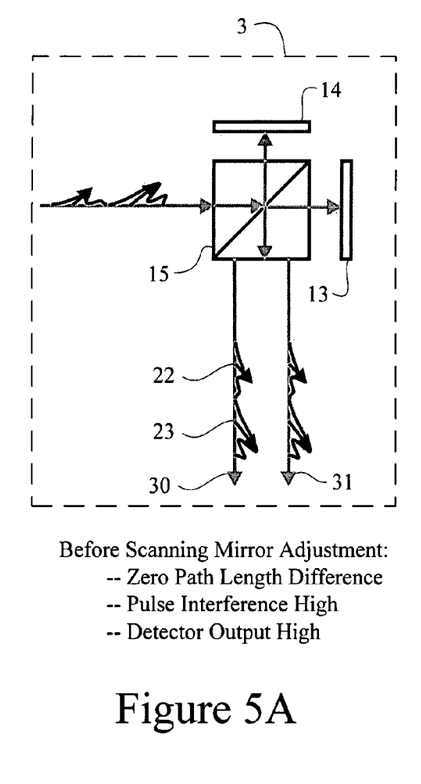
FIG. 5 is a graphical representation of the readout operation.

FIG. 5A illustrates the condition of the interferometer 3 at the output of the beamsplitter 15 before the scanning mirror 13 is adjusted. At this stage of the process, the beamsplitter 15 has split the beam of light containing the light pulses 22 and 23 into two beams (30 and 31). At this stage, because the stationary mirror 14 and the scanning mirror 13 are equidistant from the beamsplitter 15, the output monitor would show no path length difference between the two beams, so the pulse interference and detector output would be high (i.e., there is large constructive interference). This first high output level does not represent a stress concentration, but rather represents the position of the optical source in the system. The readout for this condition would appear as that of sensor length zero ("0") on FIG. 3.

Figure 5B:
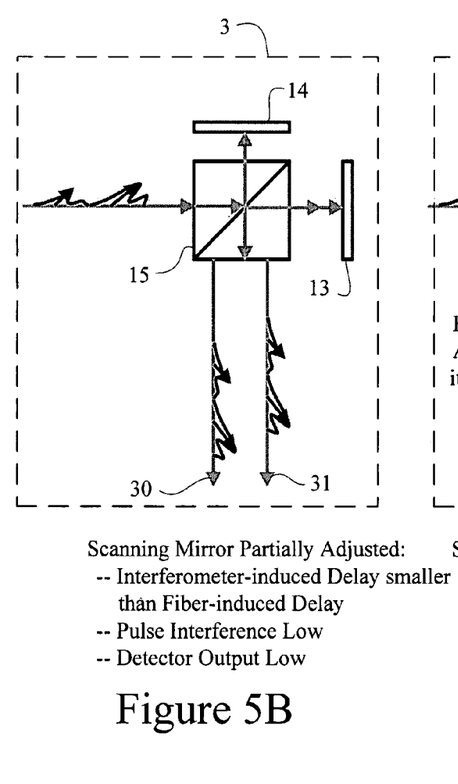
Figure 5C:
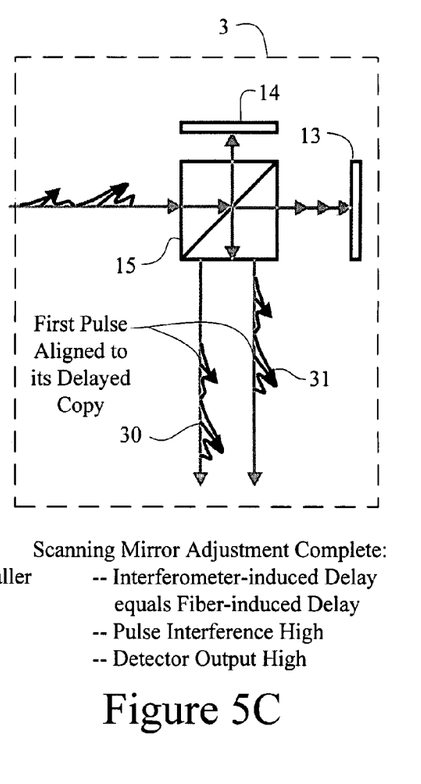

In FIG. 5B, the scanning mirror 13 has moved some distance from the beamsplitter 15, but the relative delay between the beams 30 and 31 from the two mirrors is smaller than the pulse delay created in the optical fiber sensor, and the output monitor would show low pulse interference (i.e., no stress concentration). In FIG. 5C, the scanning mirror 13 has been adjusted until the delay induced by the interferometer 3 equals that from the fiber-induced pulse, producing large constructive interference, which is displayed on the output monitor and which represents a stress concentration, as illustrated in FIG. 3 by stress concentrations 18.

When a stress concentration is placed on the optical fiber sensor a distance, L (FIG. 4), from the output end of the fiber, a first light pulse is coupled from one axis of the optical fiber into the orthogonal axis, creating a second light pulse. Due to the fiber's birefringence, one light pulse travels down the fiber faster than the other. The speeds, $v_1$ and $v_2$ (FIG. 4), with which each pulse travels down the optical fiber depends on the index of refraction for that axis of the fiber.

$$v_1 = \frac{c}{n_1}, \text{ and } v_2 = \frac{c}{n_2},$$

where c is the speed of light, and $n_1$ and $n_2$ are the indices of refraction for the two axes of the optical fiber sensor.

When the first pulse reaches the end of the fiber, after having traveled a distance, L, from the stress concentration, the separation of the two pulses is given by:

$$\Delta x_f = L*(n1-n2) = L*\Delta n,$$

where $\Delta n$ can be calculated from the specified beat length of the polarization maintaining fiber used in the fiber sensor ($L_B$) and the wavelength at which that beat length was measured ($\lambda$):

$$\Delta n = \frac{\lambda}{L_B}$$

After the first pulse leaves the end of the optical fiber, its speed changes due to entering the air inside the interferometer, which has a different index of refraction than the optical fiber. During the time that the first pulse is outside of the fiber, but the second pulse is still in the fiber, the delay between the first pulse and the second pulse, $\Delta x_T$, will widen, and is given by:

$$\Delta x_T = L*n_{fiber}\Delta n,$$

where $n_{fiber}$ is the average index of refraction for the optical fiber.

In the readout interferometer, the legs of the interferometer need to create an optical path length difference that removes the delay, $\Delta x_T$. In a Michelson configuration, only one leg of the interferometer moves, and must travel half of that required distance. Therefore, the required scanning distance for the mirror to see a stress concentration is given by $$\Delta x_T = \frac{1}{2}L*n_{fiber}\Delta n = \frac{Ln_{fiber}\lambda}{2L_B},$$

where L is the distance from the output of the fiber sensor to the stress concentration, $\lambda$ is the wavelength of light used in the measurement, $L_B$ is the beat length for the polarization maintaining fiber in the sensor, and $n_{fiber}$ is the average index of refraction for the optical fiber in the sensor.

The readout interferometer tracks the scanning distance, allowing the system to determine the distance from the output end of the fiber to the stress concentration through the relation:

$$L = \frac{2L_B \Delta x_T}{n_{fiber}\lambda}$$

For the illustrated embodiment of the sensor, the following parameters are used:

$L_B$=2 mm $\Delta x_T$=3.2 mm $n_{Fiber}$=1.65

$\lambda$=1.55 μm, which yield a total of 10 meters of sensor length that can be scanned in the illustrated embodiment. The fiber length that can be scanned by the system is dependent on the mirror scan length achievable in the interferometer, and the precision of the optical components and their alignment in the interferometer.

Figure 6:
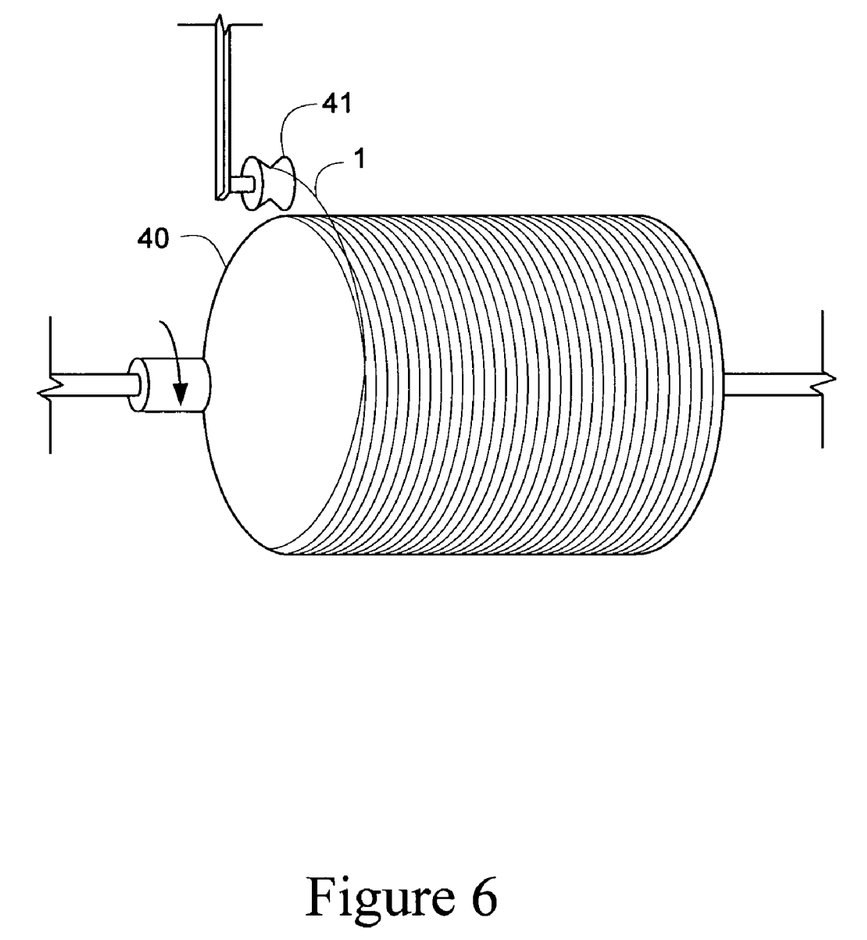
FIG. 6 is a simplified illustration of the process of embedding the fiber optic sensor in a composite wound structure.

FIG. 6 illustrates in simplified form one technique for embedding the fiber sensor into a structure utilizing a filament winding system that is well known in the art of composite fabrication. In this technique, the fiber sensor 1 is embedded into a composite wound structure 40. The winding system for the composite structure 40 has a fiber placement spool 41 that scans back and forth as the structure rotates to place the fiber sensor 1 spirally about the circumference of the structure 40. After sensor winding is completed, additional layers of composite material are wound on the structure 40 on top of the fiber sensor 1, thereby embedding it into the structure 40. After the winding operation is complete, the fiber sensor 1 is connectorized for connection to the readout system (not illustrated).

Figure 7:
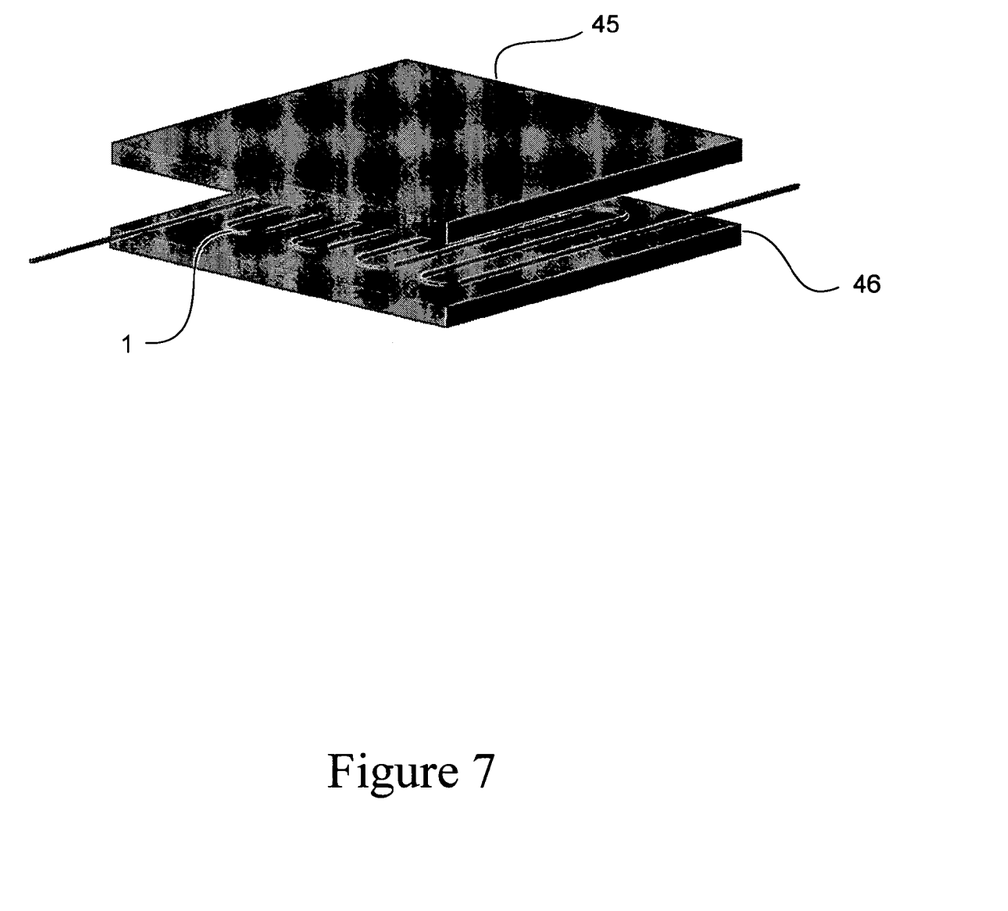
FIG. 7 shows an example of a technique for embedding the fiber optic sensor in a composite structure.

FIG. 7 illustrates an alternative method of embedding the fiber sensor 1 in a composite panel by sandwiching the fiber sensor 1 between a top composite panel 45 and a bottom composite panel 46.

Although FIGS. 6 and 7 illustrate two methods of embedding the fiber sensor into a structure, any method whereby an optical fiber can be rigidly adhered to a structure could also be employed without departing from the scope of the invention. This rigid attachment can be achieved by the composite embedding processes discussed above, but also could be achieved with a variety of adhesives. Additionally, the fiber sensor can be installed on virtually any rigid material or structure, e.g., metals, composites, hard plastics, etc.

One object of this invention is to provide the user with a means of readily identifying potential areas of damage on a structure. This quick determination that there is potential damage would then be followed by a more sophisticated analysis of the potential damage area.

An alternative embodiment of the invention would use a pulsed laser source rather than a broadband optical source such as a SLED. The pulsed source, after traveling through the sensor, could be launched into an interferometer and a similar readout performed.

Figure 8:
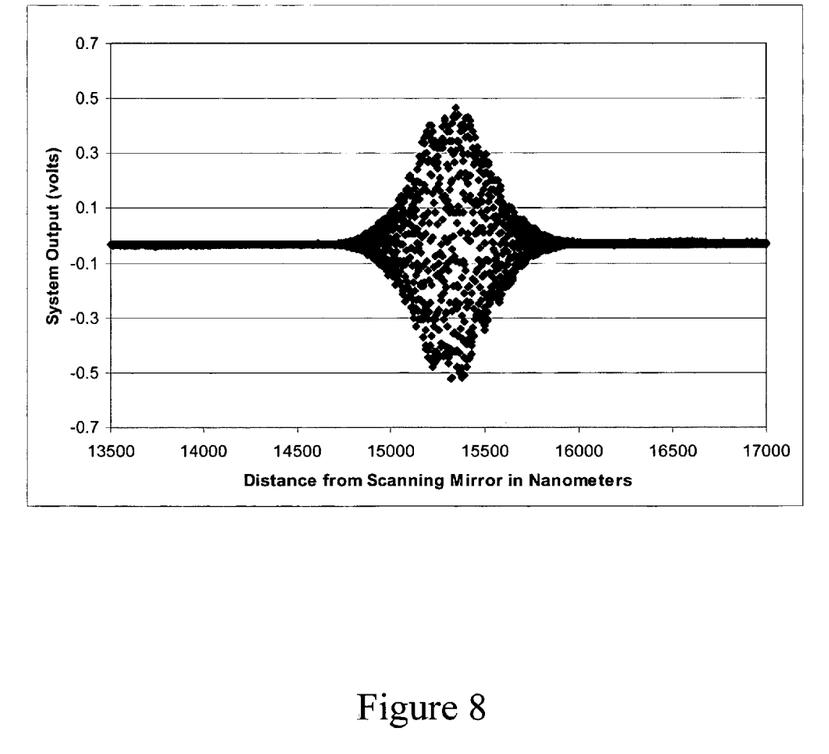
FIG. 8 is an illustrative scan from sensitivity testing of a fiber optic sensor.

Tests have been performed to evaluate the sensitivity of one embodiment of the fiber optic sensor. A finite element model was developed in preparation for a test of a ten gram round cylinder loading a bare optical fiber. The model estimated 450µε of strain for a 10 g applied weight. The test was performed and resulted in the scan of FIG. 8, showing a peak amplitude of approximately 0.5 volts, yielding a sensitivity of the sensor to mechanical strain of 1.11 mV/µε. The noise floor of the sensor is approximately 10 mV, yielding a strain resolution of approximately 9µε.

What is claimed is:

1. A method of monitoring strain on a structure, comprising:
    physically continuously contacting the structure with a polarization-maintaining single mode optical fiber;
    directing the output of an optical light source into an input end of the optical fiber;
    directing a signal from an output end of the optical fiber into a polarizer;
    creating interference of an optical signal emitted from the polarizer by using an optical interferometric device;
    detecting intensity changes at at least one non-predetermined point along the optical fiber resulting from the interference corresponding to a strain on the structure transferred to the optical fiber creating a local change in birefringence of the optical fiber and providing an electrical signal responsive thereto; and
    signal processing the electrical signal to provide one or more output signals indicative of the location of the strain on the structure corresponding to the at least one non-predetermined point along the optical fiber, wherein at least one said non-predetermined point does not use a discrete sensor to transfer strain to the optical fiber.

2. The method of claim 1, wherein physically continuously contacting comprises embedding the fiber into the structure, such that the strain on the structure is transferred to the optical fiber and said strain is detected without necessitating removal of a protective cover from the optical fiber.

3. The method of claim 1, wherein the structure is a filament wound composite structure, and where in physically continuously contacting the structure further comprises filament-winding the fiber into the filament-wound composite structure to integrate the optical fiber into the filament-wound composite structure during the fabrication of the structure.

4. The method of claim 1, wherein physically continuously contacting the structure comprises adhering the polarization-maintaining signal mode optical fiber onto the structure.

5. The method of claim 1, wherein the optical interferometric device comprises a Michelson Interferometer, and the intensity chances are detected anywhere along the length of the fiber without using discrete sensors at each strain transfer point.

6. A system for monitoring strain on a structure comprising:
    a polarization-maintaining single mode optical fiber in continuous physical contact with the structure;
    an optical light source optically coupled to the optical fiber, the optical fight source capable of supplying a light pulse into an input end of the optical fiber;
    a polarizer aligned at forty-five (45) degrees to the optical fiber's polarization axis;
    an optical interferometric device to create an optical interference from a signal emitted from an output of the optical fiber, to sense intensity chances in the interference at at least one non-predetermined point along the optical fiber corresponding to a strain on the structure transferred to the optical fiber creating a local change in birefringence of the optical fiber, and to provide an electrical signal responsive thereto;
    a signal processor to process the electrical signal to provide one or more processed output signals indicative of the location of strain at any point along the optical fiber corresponding to the at least one non-predetermined point along the optical fiber, wherein at least one said non-predetermined point does not use a discrete sensor to transfer strain to the optical fiber; and
    an output system that communicates the one or more output signals.

7. The system of claim 6, wherein the optical interferometric device comprises a Michelson Interferometer, and the intensity changes are sensed anywhere along the length of the fiber without using discrete sensors at each strain transfer point.

8. The method of claim 1, wherein physically continuously contacting the structure comprises attaching the polarization-maintaining single mode optical fiber to the structure.

9. The method of claim 1, wherein physically continuously contacting the structure comprises physical continuously contacting the fiber to a substantially surficial portion of the structure.

10. The method of claim 1, wherein the polarizer is aligned at forty-five (45 )degrees to the optical fiber's polarization axis.

11. The method of claim 1, wherein strain on the structure transferred to the optical fiber comprises a stress-induced local change in the birefringence the optical fiber, and the strain on the structure is directly transferred anywhere alone a length of the optical fiber without using discrete strain transferring devices at each strain transfer point.

12. A system to detect and locate strain at any point along a structure, comprising:
a polarization-maintaining single mode optical fiber in continuous contact with the structure, wherein a local change birefringence at a non-predetermined point along the optical fiber is created in response to a strain on the structure transferred to the optical fiber;
a light source to supply a light to the optical fiber; and
a detection unit to receive the light from the optical fiber to detect the local change in birefringence at the non-predetermined point along the optical fiber corresponding to the location of the strain on the structure, wherein at least one said non-predetermined point does not use a discrete sensor to transfer strain to the optical fiber.

13. The system of claim 12, wherein the detection unit comprises:
a polarizer to receive the light from the optical fiber and output the light onto a common polarization axis; and
an interferometer to received the light from the polarizer and to create signal according to an interference of the light corresponding to a strain on the structure to the optical fiber.

14. The system of claim 13 further comprising:
a signal processor to process the signal to provide one or more processed output signals indicative of strain on the structure; and
an output system that communicates the one or more output signals.

15. The system of claim 12 wherein the light source comprises a broadband optical source, and the light comprises a polarized short coherence length optical pulse.

16. The system of claim 13, wherein the interferometer receives the light, and compares a delay of the light caused by the stress-induced local chance in the birefringence to various amounts of delay corresponding to super imposing light front one leg of the interferometer onto light of another leg of the interferometer to calculate a distance of the stress. concentration from the end of the optical fiber, and the stress-induced local change in the birefringence is detected anywhere along the length of the optical fiber without using discrete sensors at each stress transfer point.

17. The system of claim 12 wherein multiple locations of strain on a structure, as transferred to the optical fiber, can be determined with the detection unit.

18. The system of claim 12, wherein the detection unit simultaneously detects multiple local changes in the birefringence corresponding to the location of two or more points along the optical fiber.

19. The method of claim 1, wherein the detecting of the intensity changes comprises simultaneously detecting changes at more than one non-predetermined point along the optical fiber indicating the individual locations of multiple strains transferred to the optical fiber.

20. A method of monitoring strain on a structure, comprising:
physically continuously contacting the structure with a polarization-maintaining single mode optical fiber;
directing the output of an optical light source into an input end of the optical fiber;
directing a signal from an output end of the optical fiber into a polarizer;
creating inference of an optical signal emitted from he polarizer by using an optical interferometric device;
detecting intensity changes corresponding to a local change in birefringence of the optical fiber created in response to a strain on the structure transfer to the optical fiber, the local change in birefringence occurring at a non-predetermined point along the optical fiber, the strain transferred without using a discrete sensor at at least one non-predetermined point, and providing an electrical signal responsive thereto; and
signal processing the electrical signal to provide one or more output signals indicative of the location of the strain on the structure.

21. The method of claim 20 wherein the step of signal processing provides multiple signals indicative of a plurality of stain on the structure.

* * * * *

UNITED STATES PATENT AND TRADEMARK OFFICE
CERTIFICATE OF CORRECTION

| | | |
|---|---|---|
| PATENT NO. | : 7,605,923 B2 | |
| APPLICATION NO. | : 11/251739 | |
| DATED | : October 20, 2009 | |
| INVENTOR(S) | : Williams et al. | |

It is certified that error appears in the above-identified patent and that said Letters Patent is hereby corrected as shown below:

Col. 8, Ln. 65, claim 11 Delete "alone"
                               Insert --along--

Col. 9, Ln. 19, claim 13 Delete "received"
                               Insert --receive--

Col. 9, Ln. 35, claim 16 Delete "front"
                               Insert --from--

Col. 10, Ln. 24, claim 20 Delete "inference"
                               Insert --interference--

Col. 10, Ln. 24, claim 20 Delete "he"
                               Insert --the--

Col. 10, Ln. 39, claim 21 Delete "stain"
                               Insert --strain--

Signed and Sealed this
Twenty-ninth Day of May, 2012

David J. Kappos
*Director of the United States Patent and Trademark Office*